United States Patent
Kerboeuf et al.

(10) Patent No.: US 11,431,562 B2
(45) Date of Patent: Aug. 30, 2022

(54) METHOD AND APPARATUS FOR MAPPING NETWORK SLICES ONTO NETWORK INFRASTRUCTURES WITH SLA GUARANTEE

(71) Applicant: NOKIA SOLUTIONS AND NETWORKS OY, Espoo (FI)

(72) Inventors: Sylvaine Kerboeuf, Nozay (FR); Quang Trung Luu, Nozay (FR); Michel Kieffer, Bourg-la-Reine (FR); Alexandre Mouradian, Bures-sur-Yvette (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/299,138

(22) PCT Filed: Dec. 7, 2018

(86) PCT No.: PCT/EP2018/084002
§ 371 (c)(1),
(2) Date: Jun. 2, 2021

(87) PCT Pub. No.: WO2020/114608
PCT Pub. Date: Jun. 11, 2020

(65) Prior Publication Data
US 2021/0392040 A1    Dec. 16, 2021

(51) Int. Cl.
*G06F 15/173* (2006.01)
*H04L 41/0806* (2022.01)
(Continued)

(52) U.S. Cl.
CPC .......... *H04L 41/0806* (2013.01); *H04L 41/12* (2013.01); *H04L 41/5045* (2013.01); *H04W 48/18* (2013.01)

(58) Field of Classification Search
CPC . H04L 41/0806; H04L 41/12; H04L 41/5045; H04W 48/18
(Continued)

(56) References Cited

U.S. PATENT DOCUMENTS

| | | | |
|---|---|---|---|
| 2011/0282982 A1* | 11/2011 | Jain ....................... | G06F 9/5094 709/223 |
| 2011/0320394 A1* | 12/2011 | McKeown .............. | H04L 41/12 706/47 |

(Continued)

FOREIGN PATENT DOCUMENTS

| | | |
|---|---|---|
| EP | 3306987 A1 | 4/2018 |
| WO | WO 2016/086214 A1 | 6/2016 |

OTHER PUBLICATIONS

Examination Report under Section 18(3) dated Aug. 25, 2021 corresponding to GB application No. GB2108086.6.
International Search Report and Written Opinion dated Jul. 30, 2019 corresponding to International Patent Application No. PCT/EP2018/084002.
Notification of Transmittal of the International Preliminary Report on Patentability and International Preliminary Report on Patentability dated Mar. 3, 2021 corresponding to International Patent Application No. PCT/EP2018/084002.
(Continued)

*Primary Examiner* — Atta Khan
(74) *Attorney, Agent, or Firm* — Squire Patton Boggs (US) LLP (57) ABSTRACT

A network slice managing entity, comprising means configured to
 obtain a service request for a network slice, the service request defining service requirements;
 request network slice descriptions from a database and selecting at least one network slice which support said service requirements according to the descriptions;
 generate a resource graph comprising nodes representing infrastructure resources and links representing connections between the nodes, the resource graph depicting resources needed for providing the service, wherein the generating is carried out based on a network slice description of the selected at least one network slice;
(Continued)

transmit the resource graph to an infrastructure manager for mapping a topology of said network infrastructure onto said resource graph and determining at least one subset of said network infrastructure; and, receive a mapping result from said infrastructure manager containing said at least one subset of said network infrastructure.

19 Claims, 7 Drawing Sheets

(51) Int. Cl.
*H04L 41/12* (2022.01)
*H04L 41/5041* (2022.01)
*H04W 48/18* (2009.01)

(58) Field of Classification Search
USPC .......................................................... 709/223
See application file for complete search history.

(56) References Cited

U.S. PATENT DOCUMENTS

| | | | |
|---|---|---|---|
| 2013/0055091 A1* | 2/2013 | Dutta | G06F 3/04842 715/736 |
| 2016/0212016 A1* | 7/2016 | Vrzic | H04L 41/12 |
| 2016/0212017 A1* | 7/2016 | Li | H04L 41/5051 |
| 2017/0054595 A1* | 2/2017 | Zhang | H04L 41/5051 |

OTHER PUBLICATIONS

Toufik Ahmed et al., "On-Demand Network Slicing using SDN/NFV-enabled Satellite Ground Segment Systems," 2018 4th IEEE International Conference on Network Softwarization and Workshops (NetSoft), IEEE, Jun. 25, 2018, pp. 242-246, XP033404174.

Quang-Trung Luu et al., "Aggregated Resource Provisioning for Network Slices," 2018 IEEE Global Communications Conference (Globecom), IEEE, Dec. 9, 2018, pp. 1-6, XP033520194.

Notice of Examination dated Nov. 8, 2021 corresponding to German Patent Application No. 112018008127.3, with English translation thereof.

* cited by examiner

METHOD AND APPARATUS FOR MAPPING NETWORK SLICES ONTO NETWORK INFRASTRUCTURES WITH SLA GUARANTEE

TECHNICAL FIELD

Various example embodiments relate generally to methods and apparatus for the mapping on network slices onto a network infrastructure. They may further relate to network slices as defined by the 3GPP standard organization for the fifth generation (5G) mobile telecommunication networks.

BACKGROUND

Network slicing is a key concept of the fifth generation of mobile networks, consisting in taking benefit of Network Function Virtualization (NFV) and Software Defined Networking (SDN) technologies, for building multiple dedicated and customized end-to-end virtual networks devoted to a tenant (i.e. a network customer like a vertical operator) onto a common "real" network infrastructure.

As the network slices are operated on a common network infrastructure, they need to share the resources of this infrastructure. It is therefore key to allocate the resources of the underlying network to the various Virtual Network Functions (VNF) of the slices, so as to meet the requirements of respective SLA (Service Level Agreement) or, at least, provide the best performance (in terms of e.g. bandwidth, latency, jitter, etc.)

SUMMARY

In one embodiment, a network slice managing entity for mapping at least one network slice onto a network infrastructure, comprises means configured to:
  obtain a service request for a network slice, the service request defining service requirements;
  request network slice descriptions from a database (SMO DB) and selecting at least one network slice which support said service requirements according to said network slice descriptions;
  generate a resource graph comprising nodes representing infrastructure resources and links representing connections between the nodes, and the resource graph depicting resources needed for providing the service, and wherein the generating is carried out based on a network slice description of the selected at least one network slice;
  transmit the resource graph to an infrastructure manager for mapping a topology of said network infrastructure onto said resource graph and determining at least one subset of said network infrastructure adapted for deploying said at least one network slice; and,
  receive a mapping result from said infrastructure manager containing said at least one subset of said network infrastructure.

Some embodiments comprise one or more of the following features, which can be taken separately or together, either in partial combination or in full combination:
  the network slice managing entity is further adapted to associate resource requirements to said nodes of the resource graph, including an amount of required computing resources, an amount of required storage resource and an amount of required wireless capacity resources; and to said links of the resource graph, including a bandwidth
  the network slice managing entity is further adapted to retrieve workload patterns from a database (SMO DB), and to determine the resource requirements associated to each nodes and links of said resource graph by mitigating the sum of the resources requirements associated with respective nodes and links of the service Function Chains associated to said at least one network slice, with said workload patterns;
  the network slice managing entity is further adapted to allocate the network infrastructure resources for said logical network slice, by searching an optimal solution over said subset determined by said provisioned resource graph.
  the means comprises at least one processor; and at least one memory including computer program code, the at least one memory and computer program code configured to, with the at least one processor, cause the performance of the network slice managing entity.

In one embodiment, an Infrastructure Manager for mapping at least one logical network slice onto a network infrastructure, comprises means configured to:
  receive a resource graph from a network slice managing entity (SMO) a resource graph depicting resources needed for providing a service defined by said at least one network slice;
  request a topology of said network infrastructure and available resources from a database;
  map said topology and available resources onto said resource graph; and
  determine at least one subset of said network infrastructure adapted for deploying said at least one network slice;
  transmit a mapping result to said network slice managing entity, containing said at least one subset of said network infrastructure.

Some embodiments comprise one or more of the following features, which can be taken separately or together, either in partial combination or in full combination:
  the infrastructure manager is further adapted to map said topology and available resources onto said resource graph by solving a Mixed Integer Linear Programming, MILP, problem for minimizing a cost function evaluating the total provisioning cost of said mapping, under a set of constraints;
  the infrastructure manager is further adapted to perform said resolution of a MILP problem for a plurality of said at least one slices, said cost function evaluating the total provisioning cost of the mapping of said plurality;
  the infrastructure manager is further adapted to receive a request from said network slice managing entity containing a set of network infrastructure resources to be allocated.
  the means comprises at least one processor; and at least one memory including computer program code, the at least one memory and computer program code configured to, with the at least one processor, cause the performance of the apparatus.

In an embodiment, a system for mapping at least one logical network slice onto a network infrastructure, comprising:
  a slice management entity as previously defined, and, an infrastructure manager as previously defined.

In an embodiment, a method at a network slice managing entity for mapping at least a network slice onto a network infrastructure, comprises:
  obtaining a service request for a network slice, the service request defining service requirements;

requesting network slice descriptions from a database and selecting at least one network slice which support said service requirements according to said network slice descriptions;

generating a resource graph comprising nodes representing infrastructure resources and links representing connections between the nodes, and the resource graph depicting resources needed for providing the service, and wherein the generating is carried out based on a network slice description of the selected at least one network slice;

transmitting the resource graph to an infrastructure manager for mapping a topology of said network infrastructure onto said resource graph and determining at least one subset of said network infrastructure adapted for deploying said at least one network slice;

receiving a mapping result from said infrastructure manager containing said at least one subset of said network infrastructure.

Some embodiments comprise one or more of the following features, which can be taken separately or together, either in partial combination or in full combination:

resource requirements are associated to said nodes of the resource graph, including an amount of required computing resources, an amount of required storage resource and an amount of required wireless capacity resources; and resource requirements are associated to said links of the resource graph, including a bandwidth;

the resource requirements within said resource graph equals to the sum of resource requirements of the Service Function Chains associated to said at least one network slice the method further comprises a step of retrieving workload patterns from a database, and the resource requirements associated to each nodes and links of said resource graph are determined by mitigating the sum of the resources requirements associated with respective nodes and links of the service Function Chains associated to said at least one network slice, with said workload patterns;

the resource requirements of the resource graph comprises minimum allowed resources for operations the method further comprises subsequently to the receiving of a mapping result from said infrastructure manager, an allocation step to allocate the network infrastructure resources for said logical network slice, based on said subset.

said allocation step comprises the search of an optimal solution over said subset.

In an embodiment, a method at infrastructure manager for mapping at least a network slice onto a network infrastructure, comprises;

receiving a resource graph from a network slice managing entity a resource graph depicting resources needed for providing a service defined by said at least one network slice;

requesting a topology of said network infrastructure and available resources from a database;

mapping said topology and available resources onto said resource graph; and determining at least one subset of said network infrastructure adapted for deploying said at least one network slice;

transmitting a mapping result to said network slice managing entity, containing said at least one subset of said network infrastructure;

Some embodiments comprise one or more of the following features, which can be taken separately or together, either in partial combination or in full combination:

the mapping of said topology and available resources onto said resource graph comprises the resolution of a Mixed Integer Linear Programming, MILP, problem for minimizing a cost function evaluating the total provisioning cost of said mapping, under a set of constraints;

said resolution of a MILP problem is performed for a plurality of said at least one slices, said cost function evaluating the total provisioning cost ($c_{total}$) of the mapping of said plurality;

the method further comprises receiving a request from said network slice managing entity containing a set of network infrastructure resources to be allocated;

In an embodiment, a computer readable storage medium stores instructions which, when executed by a computer, cause the computer to perform one of the methods as previously defined.

In an embodiment, a network slice managing entity for mapping at least one network slice onto a network infrastructure, comprises:

means for obtaining a service request for a network slice, the service request defining service requirements;

means for requesting network slice descriptions from a database and selecting at least one network slice which support said service requirements according to said network slice descriptions;

means for generating a resource graph comprising nodes representing infrastructure resources and links representing connections between the nodes, and the resource graph depicting resources needed for providing the service, and wherein the generating is carried out based on a network slice description of the selected at least one network slice;

means for transmitting the resource graph to an infrastructure manager for mapping a topology of said network infrastructure onto said resource graph and determining at least one subset of said network infrastructure adapted for deploying said at least one network slice; and, means for receiving a mapping result from said infrastructure manager containing said at least one subset of said network infrastructure.

In an embodiment, an Infrastructure Manager for mapping at least one logical network slice onto a network infrastructure, comprises:

means for receiving a resource graph from a network slice managing entity a resource graph depicting resources needed for providing a service defined by said at least one network slice;

means for requesting a topology of said network infrastructure and available resources from a database;

means for mapping said topology and available resources onto said resource graph; and determine at least one subset of said network infrastructure adapted for deploying said at least one network slice;

means for transmitting a mapping result to said network slice managing entity, containing said at least one subset of said network infrastructure.

BRIEF DESCRIPTION OF THE DRAWINGS

Example embodiments will now be described with reference to the accompanying drawings, in which.

DETAILED DESCRIPTION

Example embodiments will now be described, including methods and apparatus for mapping at least one logical network slice comprising a set of Service Function Chains, SFC, onto a network infrastructure.

Functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Network slicing is a key feature for the next generation network. According to a definition provided in 3GPP TR 28.801, network slicing is about transforming the network/system from a static "one size fits all" paradigm, to a new paradigm where logical networks/partitions are created, with appropriate isolation, resources and optimized topology to serve a particular purpose or service category (e.g. use case/traffic category, or for internal reasons) or even individual customers (logical system created "on demand"). It can be enriched by use of NFV (Network Function Virtualization) and SDN (Software Defined Networking).

The 3GPP standard organization defines aspects of the network slices life-cycle, notably in relation with NSIs (Network Slice Instance), i.e. after the slices are prepared. Aspects of the inventions relate rather to the slice preparation, before the creation of NSI. It is about identifying and then reserving the infrastructure resources before virtual network function (VNF) instances that are constituents of the slices are deployed.

The 3GPP defines entities for network slicing management that are NSMF (Network Slice Management Function) and NSSMF (Network Slice Subnet Management Function), which provide management services for the NSI, resp. NSSI. When the slice contains virtual network functions (VNF) or virtual links, the NSSMF interacts with the NFVO of the ETSI-MANO standard for requesting their life cycle management (LCM). NFVO (or other relevant transport network manager for virtual link) executes the infrastructure resource provisioning and instantiation/scaling/deletion of those functions and/or links.

In the ETSI MANO standards, a NFV orchestrator is provided to manage the life cycle of the network services over a virtualized infrastructure, but not for network slices.

The constituents of a slice are basically a set of logical network functions and the links for interconnecting them, with some requirements in term of resource for satisfying service needs. When a slice is provisioned, the logical network functions are mapped onto elements of the infrastructure, e.g. a network element, a server or virtual machine of a datacenter, etc. The interconnection links are also mapped onto the physical network links. The infrastructure resources are allocated so as to match the slice requirements.

Several methods have been proposed to address this technical problem, but they fail in being satisfactory. In particular, they rely in minimizing a cost function and the problem is formulated as an Integer Linear Programming (ILP) or as a Mixed Integer Linear Programming (MILP) problem, which are known to be NP-complex. Accordingly, they cannot scale up when addressing real networks and real slices encompassing large numbers of elements and VNFs.

Controversially, according to some embodiments of the invention, instead of trying to map the SFCs, chaining the VNFs for providing the services, onto a network architecture, the network architecture is mapped onto a new data structure, called Slice Request Demands, SRD, which aggregates the requirements of these SFCs. The optimization problem is made thus reversed, and we can obtain as a result a subset of the network architecture which have been mapped on this SRD, and "provisioned" for these SFCs.

At this step we can then be ensured that the SFCs can be deployed on the network architecture respectfully of the associated SLAs. Accordingly, the slice tenant may decide on whether or not allocating the slice, depending on whether the network infrastructure can or cannot guaranty fully the SLA.

Legacy methods can be used to allocate and deploy the network infrastructure resources to the slice(s), once mapped. However, these methods can be deployed on a limited subset of the network infrastructure which have previously been provisioned, so that these methods, including MILP resolution methods, do not face the scaling issue mentioned here-above.

A slice can be characterized by a set of Service Function Chains, SFC. Each SFC is made of a chained set of Virtual Network Functions (VNF). Requirements can be associated to the VNF as well as to the links connecting them. Requirements can be associated to quality of service such as a targeted geographical coverage area, a number of supported connected devices, an E2E bandwidth or an E2E latency for each connected device. Altogether, these requirements form a SLA (Service Level Agreement) formalizing a business contract between the operator of the slice (MNO) and the final customer, or tenant.

Figure 1:
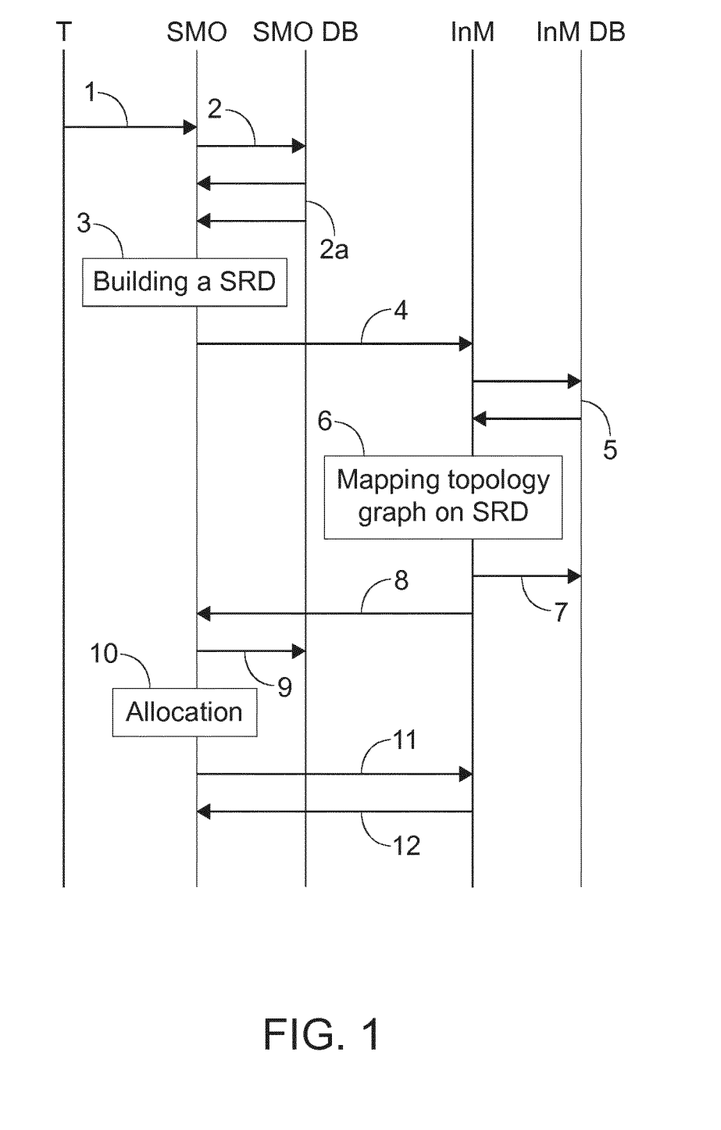
FIG. 1 illustrates an example flowchart of some embodiments described herein.
Figure 7:
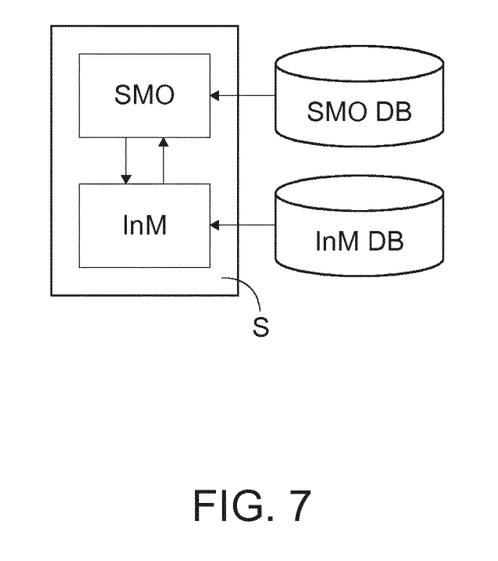
FIG. 7 shows an arrangement of the SMO and InM functions according to embodiments of the invention.

According to some embodiments of the invention, a separation is provided between aspects handled at a slice managing entity, also called Slice Management and Orchestrator (SMO), and aspects handled at an Infrastructure Manager (InM), as depicted on FIGS. 1 and 7.

This allows business separations between data owned by the slice operator and the owner of infrastructure. In general, the infrastructure's owner may not be willing to let third parties access to data related to its infrastructure. Even in large companies owning the network infrastructure and proposing network slicing services to customers, they may be internally organized such that both business activities cannot easily share all information.

In addition, the owner of the slice may not be willing to transmit to the owner of the network infrastructure any detailed information related to the final customer and about its slicing strategies. Furthermore, a single slice may encompass several networks and accordingly several respective infrastructure owner may be involved.

According to these embodiments of the invention, the organization between an SMO and an InM entities would fully address these various problems, so that the required data will be handled only locally, without any need for opening them to third parties. More precisely, not all data info are needed for exposure. The owner of the infrastructure may provide some abstracted information on its provisioned resource to the SMO but not all the details about its architecture.

However, other embodiments are possible, like for example integrating the functionalities of the SMO and InM entities into a single functional entity.

FIG. 7 shows two functionally modules SMO, and InM, which may be integrated in some embodiments into a single system S. As it will be seen below, some databases SMO DB, respectively InM DB, can be associated with the SMO and InM modules. Both of them can be integrated into the system S, or considered as independent entities. Again, the skilled person can derive various arrangements between the functions, esp. the ImM and SMO functions.

In a first step 1, the SMO receives a service request from a Tenant, T, which may, or may not, be associated with a SLA defining service requirements in terms of needed resources. For example, it can be a request for a slice service for ultra HD video service with associated bitrate, and with a required workload expressed in terms of number of users and geographical coverage.

In step 2, the slice managing entity SMO requests slice descriptions from a database and selects at least one network slice which support the services requirements, as specified in the service request, according to the slice description. In particular, the SMO can retrieve a slice catalog from the SMO database, SMO DB, and selects a slice template according to the service type requested by the tenant at step 1. One can consider in this example that a slice is devoted to a single type of service supplied by a set of SFCs, without any loss of generality.

In step 3, the SMO generates a resource graph, also called "Slice Resource Demand", SRD, graph. Such a graph is an aggregated graph representing the set of Service Function Chains, SFC, of the selected slice.

This resource graph, SRD, comprises nodes representing infrastructure resources and links representing connections between the nodes. It depicts the resources needed for providing the service. In other words, the nodes of the resource graph represent the nodes representing service requirements translated into infrastructure resources.

The generation of the SRD graph is carried out based on the network slice description of the selected network slice(s);

As a result, the resource graph, SRD, is arranged so that:
each node of the resource graph SRD corresponds to all the occurrences of a same infrastructure resource involved by the selected network slice. For instance, it may correspond to all occurrences of a function within all service function chains of the set comprised in the slice,
similarly, each link of the resource graph corresponds to all occurrences of this particular connection between the nodes. For instance, it corresponds to all occurrences of a link between two functions within all service function chains of this set;
the resource associated to each occurrence can be aggregated into the related node or link of the resource graph SRD.

In particular, according to embodiments,
to each node of the resource graph is associated resources requirements based on the requirements associated with the corresponding function for each Service Function Chain of the set,
to each link of the resource graph is associated resources requirements based on the resources requirements associated with the corresponding link for each Service Function Chain of the set, It is appreciated that the nodes of the SFCs represent the Virtual Network Functions, VNFs.

This SRD graph mimics the graph of SFCs of the selected slice, but aggregates nodes (VNF) of a same type (i.e. function) into a single node.

Figure 2:
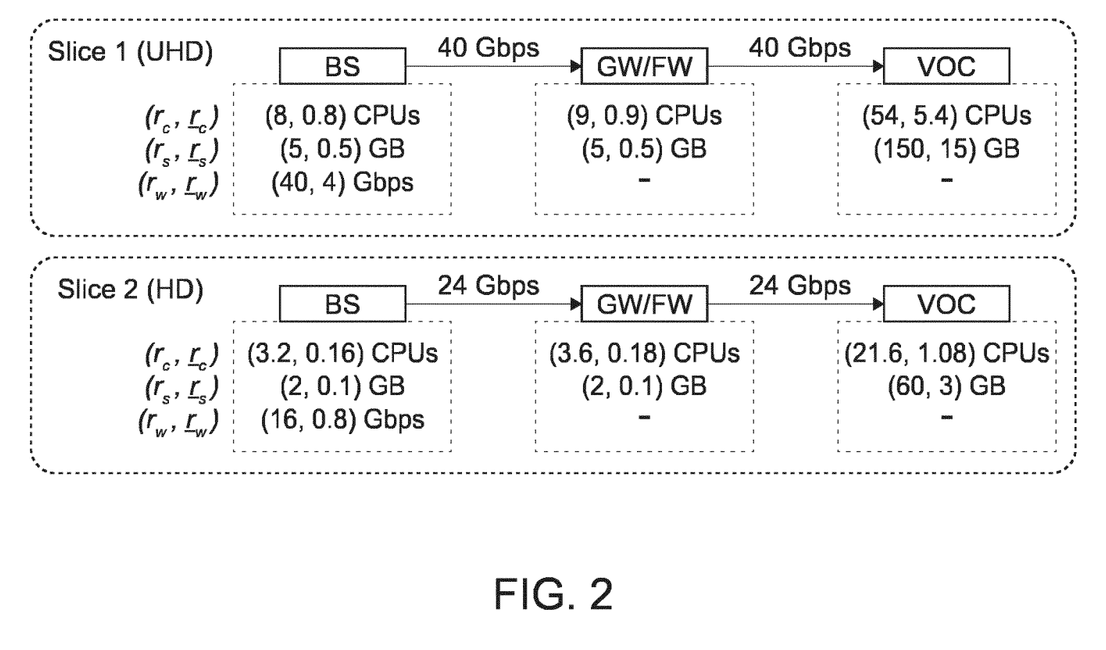
FIG. 2 shows examples of slices to illustrate some explanations of embodiments.

FIG. 2, illustrates an example of 2 slices:
a first slice is devoted to the delivery of UHD video streaming services at 20 Mbps to 2000 users.
a second slice is devoted to the delivery of HD video streaming services at 4 Mbps for 4000 users.

These slices may contain several SFC consisting each in 3 chained VNFs: a virtual base station, BS, a virtual gateway/firewall, GW/FW and a virtual Video Optimized Controller, VOC. For example, the number of chains may be equal to the number of virtual base stations needed to support the requested number of users and coverage area.

All the VNF of a same type (i.e. function) are aggregated to form a SRD graph mimicking the SFCs. Accordingly, the SRD contains also 3 nodes, one aggregating all the BS functions, all aggregating all the GW/FW functions, and one aggregating all the VOC functions. Similarly, the links of the SRD graph aggregates all the respective links.

FIG. 2 depicts these two example slices, with for each the same 3 nodes, BS, GW/FW, VOC and values corresponding to the resources requirements associated to the nodes (in the gray columns) and to the links (above the respective arrows linking the nodes).

The resource requirements associated to each node and each link can be based on the accumulation of respective values of the resource requirements of the nodes and links, respectively, For example, to each node of the SRD graph, 3 resources requirements can be associated: an amount $r_c$ of required computing resource, an amount $r_s$ of required storage resource, and an amount $r_w$ of required wireless capacity resource. These values are set so as to sustain the traffic demand for all instances of the same VNF type in the slice.

Similarly, to each link of the SRD graph, resources requirements can be associated. Such requirements may comprise a bandwidth, a latency, etc.

According to embodiments of the invention, the requirements for the SRD graph may be set in a conservative way by simply being equal to the accumulated resources requirements associated with respective nodes and links for all the SFC of the network slice. In other words, each value is a sum of the values of the corresponding resource requirements of the SFC nodes or links.

According to such an approach the SRD graph is dimensioned to satisfy the peak activity of each SFC (since it provisions the situation where each requirement needs to be satisfied at a same time for each SFC).

According to other embodiments of the invention, the determination of the resource requirements takes also into account the fact that the peak activities are not reached simultaneously and continuously in every parts of the various SFCs of a slice. This approach may make use of usage coefficients derived from MNO experience-base estimates of the average resource usage for each VNF of an SFC based on user mobility and service consumption patterns. These data may be retrieved from the SMO DB, step 2a, which may contain workload patterns. The SMO database, SMO DB, can be populated by analytics tools which are adapted to analyses the traffic and resources consumption with the infrastructure networks and deduce from them some predictive models, or patterns.

These workload patterns can then be used to determined resource requirements of the said SRD graph (i.e. including resource requirements of nodes and links)

For instance, one can assume that a single SFC requires provisioning at most 0,1 CPU for a virtual DNS. Considering a slice with 1200 similar SFCs, then 12 CPU resources should be provisioned to implement the DNS server. Consequently, the virtual DNS needs 6 servers with two CPUs. Nevertheless, if one assumes that a single SFC uses 0,1 CPU of DNS for 1% of the time in average, then the total CPU usage is reduced to 1,2 CPU and one needs thus only a single server with two CPUs to sustain the total traffic.

Since the SFCs will be deployed on the provisioned infrastructure nodes and links, each node which resources have been partly (at least) provisioned should be able to host some VNFs. Similarly, each link should have enough bandwidth to carry traffic between two VNFs. Consequently, according to some embodiments of the invention, a minimum of resource required for the operation is also imposed to each nodes and links involved in the provisioning.

These minimum resource requirements are noted $r_p$, $r_s$, $r_w$, respectively for the processing resource requirements, the storage resource requirements and the wireless capacity resource requirements.

To sum up, according to some embodiments of the invention, SRD nodes are associated with resources requirements related to processing, storage and bandwidth, comprising in addition minimum allowed resources for the operations of the infrastructure nodes $r_p$, $r_s$, $r_w$.

The SRD graph represents then the resources required by the slice (as defined by each of its SFCs) with respect to the SLA provided by the tenant. Accordingly, mapping the network infrastructure onto the SRD graph populated with the resource requirements (derived from the SLA) guarantees that the SLA will be respected by actual deployment, or allocation, based on this mapping.

Figure 3:
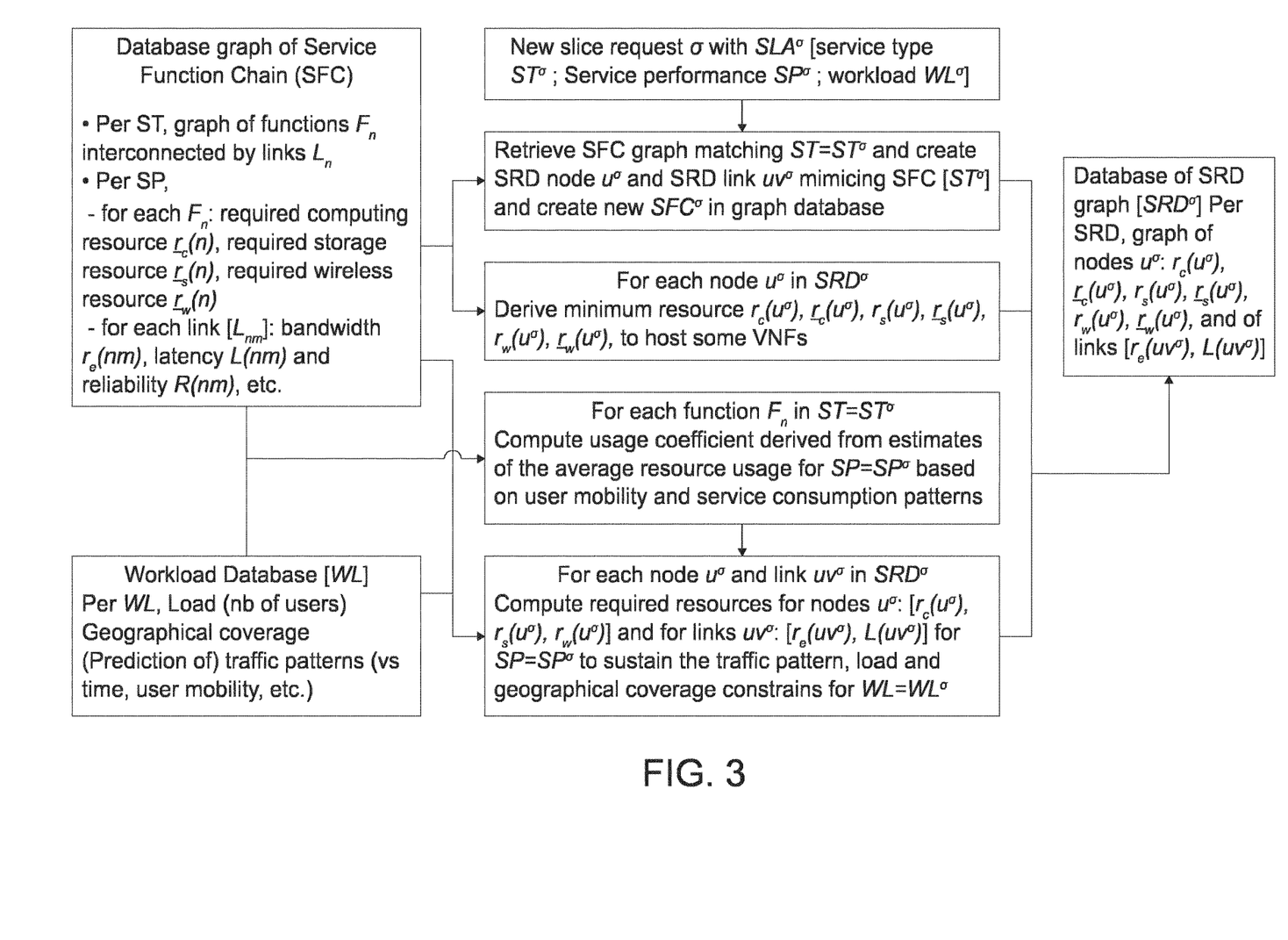
FIG. 3 illustrates an example of an algorithm for determining an SRD graph according to embodiments.

FIG. 3 illustrates an example algorithm for determining a SRD graph, by making use of a workload database WL. In this algorithm, u, v denote SRD nodes, and uv represents a link between nodes of the SRD graph being constituted.

Once the SRD graph is built, at step 4 in FIG. 1, a request is transmitted from the SMO module to the InM module containing this SRD graph and requiring the pre-provisioning of the slice corresponding to this SRD graph.

At receipt of this request, the Infrastructure Manager, InM, retrieves, step 5, data from the Infrastructure Manager database, comprising data related to the resources and topology and data related to the costs of the infrastructure nodes and links. In particular a representation of the infrastructure topology is retrieved. In addition, the amount of available resources may also be retrieved (i.e. the remaining amount of resources, as impacted by previously-allocated slices or other concurrent services).

In step 6, the infrastructure Manager, InM, determines a subset of the network infrastructure for deploying, or provisioning, the network slice, by mapping a topology graph representing this network infrastructure onto said SRD graph.

It should be appreciated that although most of the solutions described in the art would try to map each VNF onto one node of the infrastructure, according to aspects of the invention, controversially, one aims in mapping multiple infrastructure nodes into the SRD. Accordingly a new formulation of the problem is proposed, almost reversed to the one acknowledged in the art.

This problem can be further formulated as an optimization problem aiming at minimizing the cost of the used infrastructure while respecting a set of constraints related to infrastructure resource availability and SLA. Such a problem can be solved using a Mixed Integer Linear Programming (MILP) solver.

Mixed Integer Linear programming is a mathematical optimization or feasibility program, well known to the skilled person in the art. Basics can be found in the associated Wikipedia page:

https://en.wikipedia.org/wiki/Integer_programming

Several tools and programs are available and can be used, like for instance https://support.sas.com/rnd/app/or/procedures/milp.html One denotes $c_d(v)$ the cost for deploying the VNF v on the infrastructure. The objective is then to minimize the total deployment cost of a set of slices.

To formulate this resource pre-provisioning problem, we introduce the set of variables $\Phi_n$, $\Phi_e$, $\widetilde{\Phi_n}$, and $\kappa_n$, Where $\Phi_n = \{\phi_n^\sigma(i,v)\}_{i \in \mathcal{N}_s, v \in \mathcal{N}_v^\sigma, \sigma \in S, n \in \{c,s,w\}}$ represents the proportion or resources of type n (i.e. either "c", "s" or "w", corresponding to computing, storage, and wireless, respectively) provisioned on the physical node $i \in \mathcal{G}^s$ for the virtual node $v \in \mathcal{N}_v^\sigma$ of the slice $\sigma$, wherein $\mathcal{G}^s$ represents the infrastructure topology graph, and $\mathcal{N}_v^\sigma$ represents the set of all SRD nodes in the slice $\sigma$ of the set of slices S;

$\Phi_e = \{\phi_e^\sigma(ij,vw)\}_{ij \in \varepsilon_s, vw \in \varepsilon_v^\sigma, \sigma \in S}$ represents the proportion of bandwidth of the physical link $ij \in \varepsilon_s$, provisioned on the virtual link $vw \in \varepsilon_v^\sigma$ of the slice $\sigma$ of the set of slices S, and wherein $\varepsilon_s$ is the set of the infrastructure links, and $\varepsilon_v^\sigma$ represents the set of all SRD links in the slice $\sigma$.

Both $\Phi_n$, $\Phi_e$ are sets of non-negative real variables ranging from 0 to 1. When one of the variable equals zero, this means there is no mapping between the infrastructure and the SRD node or link.

The set of binary variable $\widetilde{\Phi_n} = \{\widetilde{\phi}_n^\sigma (i,v)\}_{i \in \mathcal{N}_s, v \in \mathcal{N}_v^\sigma, \sigma \in S, n \in \{c,s,w\}}$ contains node mapping indicators, i.e.

$$\begin{cases} \widetilde{\phi}_n^\sigma(i, v) = 1 & \text{if } \phi_n^\sigma(i, v) > 0 \\ \widetilde{\phi}_n^\sigma(i, v) = 0 & \text{otherwise} \end{cases}$$

These variables are used to determine whether infrastructure nodes have provisioned resources for some SRD nodes.

The set of integer variables $\kappa_n = \{\kappa_n^\sigma(i,v)\}_{i \in \mathcal{N}_s, v \in \mathcal{N}_v^\sigma, \sigma \in S, n \in \{c,s,w\}}$ is used for the sixth constraint, which ensures an appropriate amount of resource should be provisioned to tailor the minimum resource requirement (i.e., the resource demand of a single SFC).

According to embodiments of the invention, the pre-provisioning is done for a single slice. Whenever several slices need to be pre-provisioned, they can be handled in sequence, one after the other.

In the following the superscript σ will be omitted to lighten the notations.

The total provisioning cost $c_{total}$ can be defined as $$c_{total}(\widetilde{\Phi}_n, \Phi_n, \Phi_e) = \sum_{i \in \mathcal{N}_s} \sum_{v \in \mathcal{N}_v} \widetilde{\phi}_n(i,v) \cdot c_d(v) +$$
$$\sum_{i \in \mathcal{N}_s} \sum_{v \in \mathcal{N}_v} \sum_{n \in \{c,s,w\}} a_n(i) \cdot \phi_n(i,v) \cdot c_n(i) + \sum_{ij \in \mathcal{E}_s} \sum_{vw \in \mathcal{E}_v} a_e(ij) \cdot \phi_e(ij,vw) \cdot c_e(ij)$$

The first terms represent the cost of deploying VNFs in infrastructures nodes.

The second and third terms represent the respective costs for leasing resources from infrastructure nodes and links.

The minimization of the total cost $c_{total}(\widetilde{\Phi}_n, \Phi_n, \Phi_e)$ needs to be done while satisfying a set of constraints, comprising:
  Constraint 1: node resource satisfaction
  Constraint 2: node resource constraint
  Constraint 3: link resource constraint
  Constraint 4: relationship between the variables
  Constraint 5: node mapping limit
  Constraint 6: node minimum resource requirement
  Constraint 7: resource proportionality
  Constraint 8: flow conservation The first constraint consists in having the resources provided by all infrastructures nodes $i \in \mathcal{N}_s$ mapped to an SRD node v should satisfy its resource demands. This first constraint can be expressed as:

$$\Sigma_{i \in \mathcal{N}_s} a_n(i) \cdot \phi_n(i,v) \geq r_n(v), \forall n \in \{c,s,w\}, \forall v \in \mathcal{N}_v$$

Since the proportions of resources provisioned by a given infrastructure node I cannot exceed one, a second constraint can be written as:

$$\Sigma_{v \in \mathcal{N}_v} \phi_n(i,v) \leq 1, \forall n \in \{c,s,w\}, \forall i \in \mathcal{N}_s$$

Similarly, the proportions of resources provisioned by a given infrastructure link ij cannot exceed one. As a consequence, a third constraint can be written as:

$$\Sigma_{vw \in \mathcal{E}_v} \phi_e(ij,vw) \leq 1, \forall ij \in \mathcal{E}_s$$

The elements $\widetilde{\phi}_n(i,v)$ of $\widetilde{\Phi}_n$ are such that $\widetilde{\phi}_n^\sigma(i,v) = 1$ if $\phi_n^\sigma(i,v) > 0$ (see above). The relation between $\phi_n^\sigma(i,v)$ and $\widetilde{\phi}_n^\sigma(i,v)$ is nonlinear. To address this issue, both quantities can be combined with the following linear constraints:

$$\phi_n(i,v) \leq \widetilde{\phi}_n(i,v) \leq \phi_n(i,v) + 1$$

$$\forall i \in \mathcal{N}_s, \forall v \in \mathcal{N}_v, \forall n \in \{c,s,w\}$$

One can furthermore impose that any infrastructure node $i \in \mathcal{N}_s$ cannot provision resources for more than a single SRD node of a given slice. This increases robustness to infrastructure node failure and can be translated into the fifth constraint:

$$\Sigma_{v \in \mathcal{N}_v} \widetilde{\phi}_n(i,v) \leq 1, \forall i \in \mathcal{N}_s$$

The amount of resources provided by a given infrastructure node i, when it is mapped onto an SRD node v, has to be exactly an integer multiple of the minimum resource requirement $r_n$. This ensures that enough resources are provisioned to fit one or many VNF minimum required resource.

This sixth constraint can be formulated as $$a_n(i)\phi_n(i,v) = r_n(v)\kappa_n(i,v)$$

$$\forall i \in \mathcal{N}_s, \forall v \in \mathcal{N}_v, \forall n \in \{c,s,w\}$$

Moreover, provisioning of infrastructure node and link resources has to be performed in a balanced way, consistent with the SRD graph. When an infrastructure node is provisioned for the slice, the amount of provisioned computing, storage and wireless capacity has to be in the same proportion as the corresponding resources of the SRD node.

We can further assume than every SRD nodes require computing and storage resources, i.e. $r_c(v) > 0$ and $r_s(v) > 0$, $\forall v \in \mathcal{N}_v$, while only certain nodes need wireless capacity. In other words, all the resources do not play similar roles. A node resource proportionality satisfaction constraint (constraint 7) can then be written as:

$$\frac{a_c(i)}{r_c(v)}\phi_c(i,v) = \frac{a_s(i)}{r_s(v)}\phi_s(i,v) = \frac{a_w(i)}{r_w(v)}\phi_w(i,v), \text{ and}$$

$$\forall i \in \mathcal{N}_s, \forall v \in \mathcal{N}_v, r_w > 0$$

$$\frac{a_c(i)}{r_c(v)}\phi_c(i,v) = \frac{a_s(i)}{r_s(v)}\phi_s(i,v)$$

$$\forall i \in \mathcal{N}_s, \forall v \in \mathcal{N}_v, r_w = 0$$

These constraints ensure that the infrastructure node I should provision the same proportion of storage, computing and possibly wireless resources for the SRD node v. It is appreciated that unbalanced resources provisioning is thus avoided.

Finally, some flow conservation constraints have also to be satisfied when resources are provisioned on the infrastructure link ij for the SRD link vw. That is, for each link $vw \in \mathcal{E}_v$, there must exist a continuous connection between each pair of infrastructure nodes that are mapped on the pair (v, w) of SRD nodes.

The proportion of resources on the flow of the SRD link vw entering/leaving an infrastructure node mapped onto v or w should be equal to the proportion of any resource this node provides to v or w.

Focusing on the computing resource, this eighth constraint can be formulated as:

$$\sum_{j \in \mathcal{N}_s} \left[ \frac{a_e(ij)}{r_e(vw)}\phi_e(ij,vw) - \frac{a_e(ji)}{r_e(vw)}\phi_e(ji,vw) \right] = \frac{a_c(i)}{r_c(v)}\phi_c(i,v) - \frac{a_c(i)}{r_c(v)}\phi_c(i,v)$$

$$\forall i \in \mathcal{N}_s, \forall vw \in \mathcal{E}_v$$

The consistency with the other provisioned resources is ensured by the previous equations related to the node resource proportionality satisfaction constraints.

Figure 4:
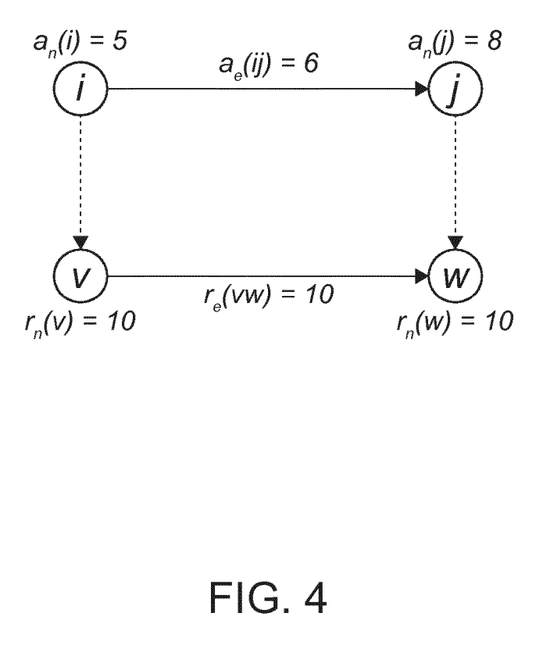
FIG. 4 shows example of mapping between the infrastructure network and the SRD graph, according to some embodiments.

In the example depicted on FIG. 4, a mapping between the infrastructure link ij and the SRD link vw, and between the infrastructure nodes I and j and the SRD nodes v and w has to be found. The previous constraint leads to $$\tfrac{5}{10}\phi_e(ij,vw)-0=\tfrac{5}{10}\phi_n(i,v)-0$$

Since $0\leq\phi_n(i,v)$, $\phi_e(ij, vw)\leq 1$ and to minimized the total provisioning cost depending on $\phi_n(i,v)$ and $\phi_e$ (ij, vw), one obtains $\phi_e$ (ij, vw)=⅚ and $\phi_n$ (i,v)=½. Similarly, $\phi_n$(j, w)=⅝. The proposition of provisioned infrastructure node and link resources are then consistent with the proportions of nodes and link resource demands.

Finally, the resource provisioning problem consists in finding:

$(\widetilde{\Phi}_n, \widetilde{\Phi}_n, \widetilde{\Phi}_e)$=argmin $c_{total}(\widetilde{\Phi}_n, \Phi_n, \Phi_e)$, under the above-described constraints. Such a problem is a Mixed Integer Linear Programming (MILP) problem, which can thus be solved with technics and tools known in the art.

According to other embodiments of the invention, a plurality slices can be pre-reserved on a same processing.

When resource pre-provisioning has to be performed for several SRD graphs for slices with indexes $\sigma \in S$, the objective function becomes:

$$c_{total}(\widetilde{\Phi}_n, \Phi_n, \Phi_e) =$$

$$\sum_{\sigma\in S}\sum_{i\in N_S}\sum_{v\in N_v^\sigma}\phi_n^\sigma(i,v)\cdot c_d(v) + \sum_{\sigma\in S}\sum_{i\in N_S}\sum_{v\in N_v^\sigma}\sum_{n\in\{c,s,w\}}a_n(i)\cdot\phi_n^\sigma(i,v)\cdot c_n(i) +$$

$$\sum_{\sigma\in S}\sum_{ij\in E_S}\sum_{vw\in E_v}a_e(ij)\cdot\phi_e^\sigma(ij,vw)\cdot c_e(ij)$$

The constraints described for the single-slice embodiments are adapted so as to take into account all slices $\sigma\in S$.

Figure 5:
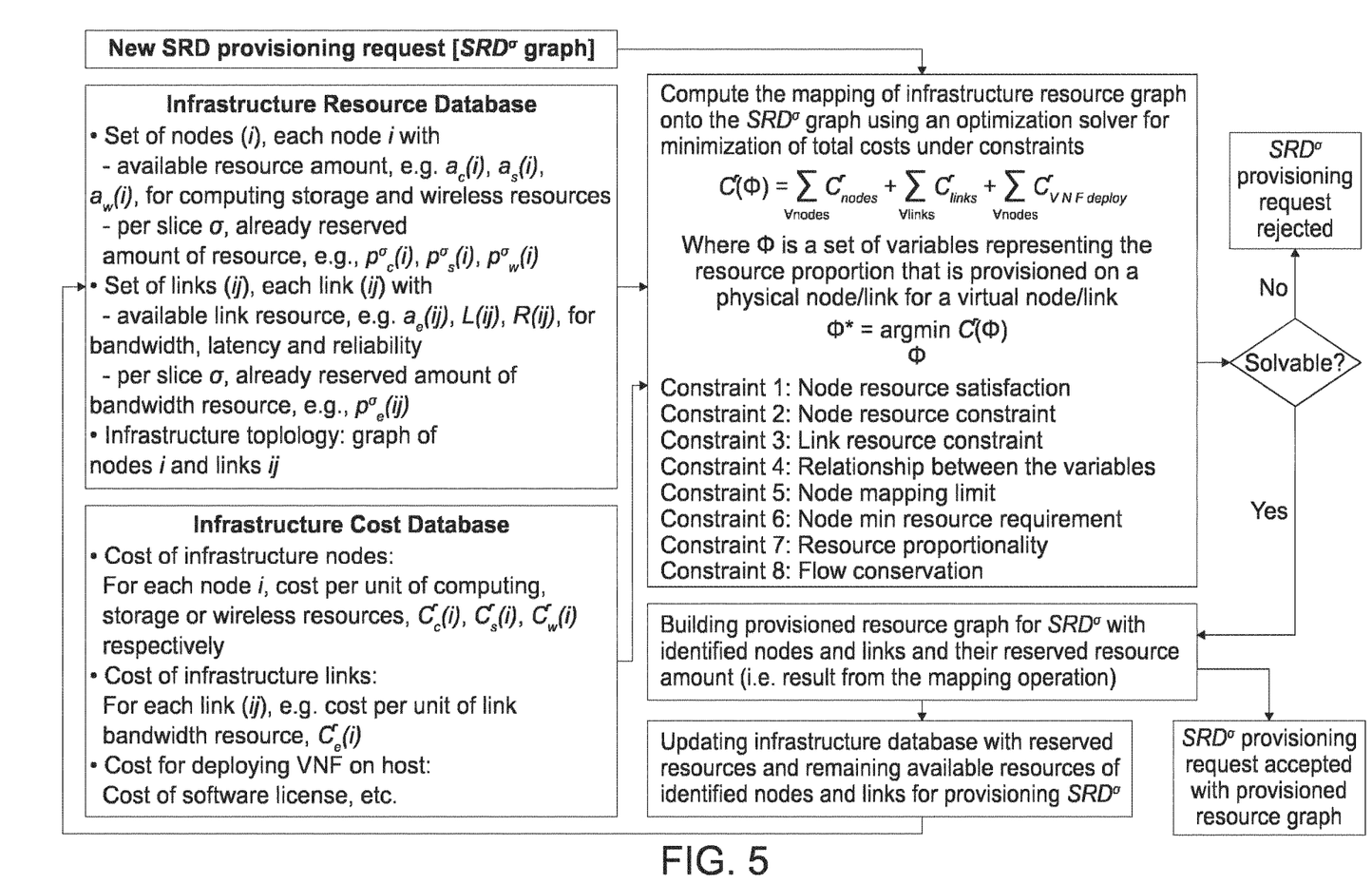
FIG. 5 illustrates an example of an algorithm for the step of determination of a subset of the network infrastructure.

FIG. 5 shows high-level organigram of possible embodiments of this step 6 of determination of a subset of the network infrastructure.

As a result of this step 6, a subset of the infrastructure topology (nodes and links) is determined with the respective amount of resources in terms of computing, storage and wireless capacity, as well as the link bandwidth, which would need to be allocated on the network infrastructure for satisfying the SRD corresponding the slice selected in response of the initial service request. This result may be called «provisioned resource graph».

According to embodiments of the invention, the Infrastructure Manager, InM, updates, in a step 7, the Infrastructure Manager Database, by pre-reserving the resources identified by the provisioned resource graph into the database. This enables subsequent requests to be handled while taking into account the already-pre-reserved slices.

This provisioned resource graph may be then transmitted to the SMO, step 8.

The SMO can then updates the SMO database, SMO DB, accordingly, step 9.

According to embodiments of the invention, an allocation step 10 (or "embedding" step) can be put in place in order to actually allocate the network infrastructure resources for the deployment of the slice.

Several implementations are possible to realize this actual allocation. Some solutions known in art can be used on the base of the subset of the network infrastructure topology furnished by the mapping step 6, and in particular those aiming in determining optimal solutions and which are proven to address a NP complex problem and being inefficient in some real-live situations. Indeed, the amount of data on which the optimal solution having been dramatically reduced down to the network topology defined by the provisioned resource graph transmitted by the Infrastructure Manager, InM.

Solutions in the art may comprise those described in:
R. Riggio, A. Bradai, D. Harutyunyan, T. Rasheed and T. Ahmed, "Scheduling Wireless Virtual Networks Functions", in *IEEE Transactions on Network and Service Management*, vol. 13, no. 12, pp. 240-252, 2016;
N. Buten, R. Mijumbi, J. Serrat, J. Famaey, S. Latre, and F. De Turck, «Semantically Enhanced Mapping Algorithm for Affinity-Constrained Service Function Chain Requests», *IEEE Transactions on Network and Service Management*, vol. 14, no. 2, pp. 317-331, 2017.

The actual allocation of the resources may be performed by the Infrastructure manager ImM, after reception of the request of step 11, received from the SMO, containing the set of network elements (i.e. nodes and links) to be allocated, with respective amount of resources (n=c, s, w). Once actually allocated, the infrastructure Manager ImM can send back, step 12, a message to the SMO acknowledging this actual allocation. The SMO can then guarantee to the requesting tenant that the slice has been allocated respectfully of the provided SLA.

Figure 6A:
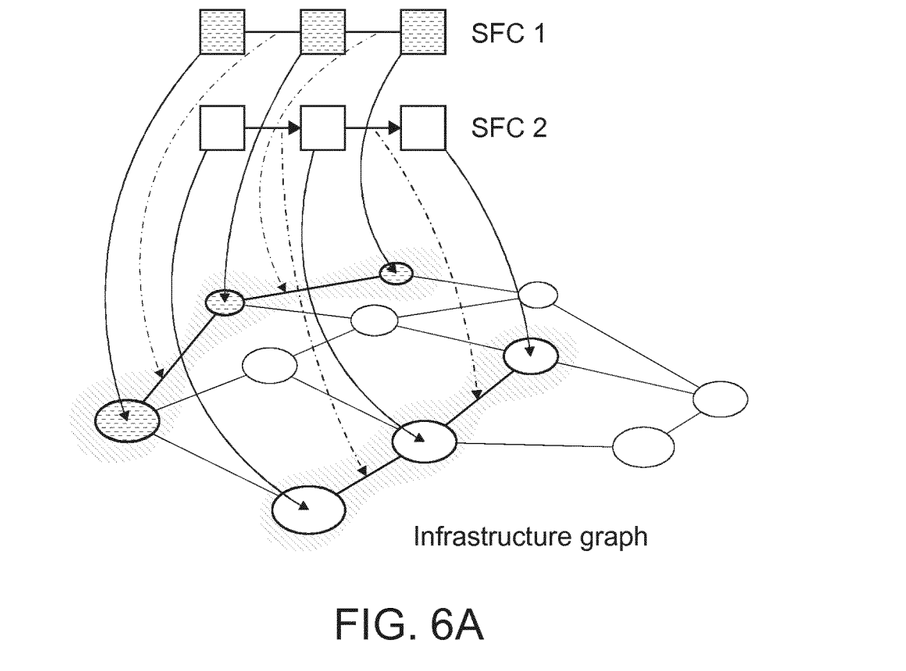
FIGS. 6a, 6b, 6c illustrate results on an example network infrastructure of the allocation process, according to embodiments of the invention.
Figure 6B:
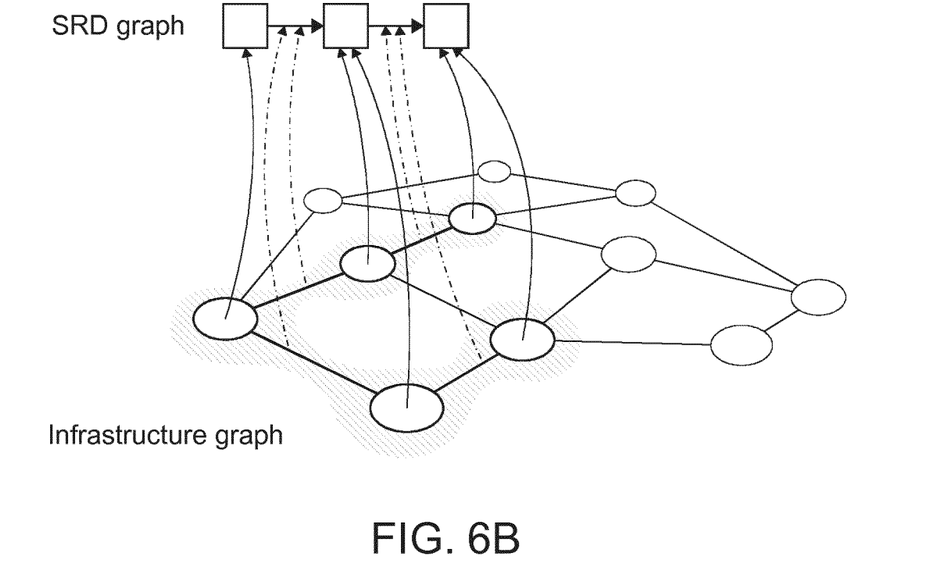
Figure 6C:
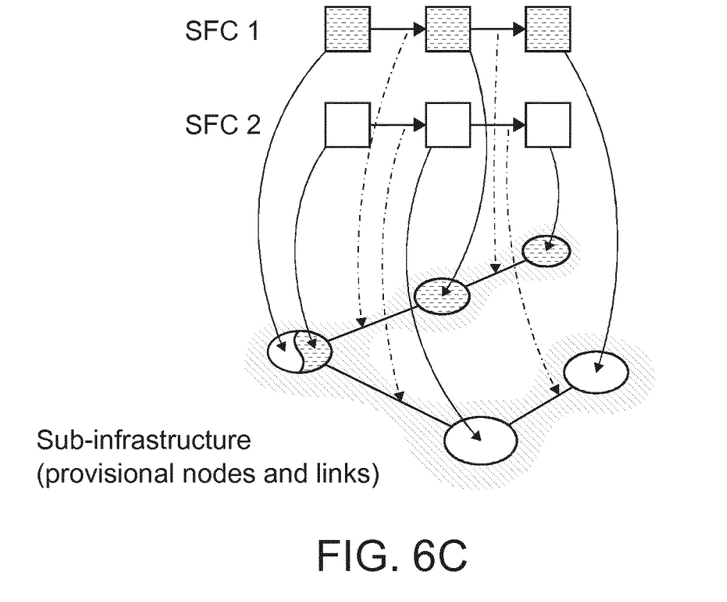

FIGS. 6a, 6b, 6c show results on an example network infrastructure of the allocation process. All figures show a same network infrastructure, made of nodes (points) and links (line segments) interconnecting them.

FIG. 6a show two SFCs mapped onto the network infrastructure. Assuming a slice is made of these 2 SFCs, the figure shows the process of mapping a slice onto the infrastructure This simplified example shows the result of finding the best arrangement for the SFC among the infrastructure nodes and links.

FIG. 6b show a result provided by an embodiments of the mapping method explained above. In bold are represented a subset of the whole network topology, representing the provisioned resource graph, as determined by the SMO.

FIG. 6c depicts how similar algorithms than the ones used for FIG. 6a may work out from the reduced dataset of FIG. 6b. In fact, it shows than the same allocations are found for both SFC, but by manipulating much less data and, consequently, reaching higher levels of computing performances.

For instance, deploying 5 SFCs on a small network infrastructure (e.g., fat-tree topology-based network with 18 nodes and 40 links), conventional method needs 11.33 seconds for the allocation, whereas embodiments of the invention required only 5.90 seconds. To deploy 25 SFCs on a larger infrastructure with 36 nodes and 96 links, the latter method only takes 62.10 seconds, while the former needs 525.63 seconds. The difference of computing time shall increase as the network size increases.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

A further embodiment is a computer program product comprising a computer readable storage medium having computer readable program code embodied therein, the computer readable program code being configured to implement one of the above methods when being loaded on a computer, a processor, or a programmable hardware component. In some embodiments, the computer readable storage medium is non-transitory.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

The invention claimed is:

1. A network slice managing entity (SMO) for mapping at least one network slice (σ) onto a network infrastructure, comprising:
   at least one processor; and
   at least one memory including computer program code, the at least one memory and computer program code configured to, with the at least one processor, cause the apparatus to
   obtain a service request for a network slice, the service request defining service requirements;
   request network slice descriptions from a database (SMO DB) and selecting at least one network slice which support said service requirements according to said network slice descriptions;
   generate a resource graph comprising nodes representing infrastructure resources and links representing connections between the nodes, and the resource graph depicting resources needed for providing the service, wherein the generating is carried out based on a network slice description of the selected at least one network slice, and wherein each node corresponds to all occurrence of a same infrastructure resource involved by said at least one network slice, and each link corresponds to all occurrences of a same connection between said infrastructure resources;
   transmit the resource graph to an infrastructure manager (InM) for mapping a topology of said network infrastructure onto said resource graph by solving a Mixed Integer Linear Programming, MILP, problem for minimizing a cost function evaluating the total provisioning cost ($c_{total}$) of said mapping, under a set of constraints and determining at least one subset of said network infrastructure adapted for deploying said at least one network slice; and
   receive a mapping result from said infrastructure manager (InM) containing said at least one subset of said network infrastructure.

2. The network slice managing entity (SMO) according to claim 1, adapted to associate resource requirements to said nodes of the resource graph, including an amount of required computing resources, an amount of required storage resource and an amount of required wireless capacity resources; and to said links of the resource graph, including a bandwidth.

3. The network slice managing entity (SMO) according to claim 1, adapted to retrieve workload patterns from a database (SMO DB), and to determine the resource requirements associated to each nodes and links of said resource graph by mitigating the sum of the resources requirements associated with respective nodes and links of the service Function Chains associated to said at least one network slice, with said workload patterns.

4. The network slice managing entity (SMO) according to claim 1, further adapted to allocate the network infrastructure resources for said logical network slice, by searching an optimal solution over said subset determined by said provisioned resource graph.

5. An Infrastructure Manager (InM) for mapping at least one logical network slice onto a network infrastructure, comprising:
   at least one processor; and
   at least one memory including computer program code, the at least one memory and computer program code configured to, with the at least one processor, cause the apparatus to
   receive a resource graph from a network slice managing entity (SMO), the resource graph depicting resources needed for providing a service defined by said at least one network slice, and comprising nodes representing infrastructure resources and links representing connections between the nodes and wherein each node corresponds to all occurrence of a same infrastructure resource involved by said at least one network slice, and each link corresponds to all occurrences of a same connection between said infrastructure resources;
   request a topology of said network infrastructure and available resources from a database (InM DB);
   map said topology and available resources onto said resource graph by solving a Mixed Integer Linear Programming, MILP, problem for minimizing a cost function evaluating the total provisioning cost ($c_{total}$) of said mapping, under a set of constraints;
   determine at least one subset of said network infrastructure adapted for deploying said at least one network slice; and
   transmit a mapping result to said network slice managing entity, containing said at least one subset of said network infrastructure.

6. The Infrastructure Manager (InM) according to claim 5, further adapted to perform said resolution of the MILP problem for a plurality of said at least one slices, said cost function evaluating the total provisioning cost ($c_{total}$) of the mapping of said plurality.

7. The Infrastructure Manager (InM) according to claim 5, further adapted to receive a request from said network slice managing entity containing a set of network infrastructure resources to be allocated.

8. A system (S) for mapping at least one network slice onto a network infrastructure, comprising at least:
- a slice managing entity (SMO) according to claim 1; and,
- an Infrastructure Manager (InM) for mapping at least one logical network slice onto a network infrastructure, the InM comprising:
- at least one other processor; and
- at least one other memory including other computer program code, the at least one other memory and other computer program code configured to, with the at least one other processor, cause the InM to
- receive a resource graph from the network slice managing entity (SMO), the resource graph depicting resources needed for providing a service defined by said at least one network slice, and comprising nodes representing infrastructure resources and links representing connections between the nodes and wherein each node corresponds to all occurrence of a same infrastructure resource involved by said at least one network slice, and each link corresponds to all occurrences of a same connection between said infrastructure resources;
- request a topology of said network infrastructure and available resources from a database (InM DB);
- map said topology and available resources onto said resource graph by solving the MILP problem for minimizing the cost function evaluating the total provisioning cost ($c_{total}$) of said mapping, under the set of constraints; and determine at least one subset of said network infrastructure adapted for deploying said at least one network slice;
- transmit a mapping result to said network slice managing entity, containing said at least one subset of said network infrastructure.

9. A method at a network slice managing entity (SMO) for mapping at least a network slice onto a network infrastructure, the method comprising:
- obtaining a service request for a network slice, the service request defining service requirements;
- requesting network slice descriptions from a database (SMO DB) and selecting at least one network slice which support said service requirements according to said network slice descriptions;
- generating a resource graph comprising nodes representing infrastructure resources and links representing connections between the nodes, and the resource graph depicting resources needed for providing the service, wherein the generating is carried out based on a network slice description of the selected at least one network slice, and wherein each node corresponds to all occurrence of a same infrastructure resource involved by said at least one network slice, and each link corresponds to all occurrences of a same connection between said infrastructure resources;
- transmitting the resource graph to an infrastructure manager (InM) for mapping a topology of said network infrastructure onto said resource graph by solving a Mixed Integer Linear Programming, MILP, problem for minimizing a cost function evaluating the total provisioning cost ($c_{total}$) of said mapping, under a set of constraints and determining at least one subset of said network infrastructure adapted for deploying said at least one network slice; and
- receiving a mapping result from said infrastructure manager (InM) containing said at least one subset of said network infrastructure.

10. The method according to claim 9, wherein resource requirements are associated to said nodes of the resource graph, including an amount of required computing resources, an amount of required storage resource and an amount of required wireless capacity resources; and resource requirements are associated to said links of the resource graph, including a bandwidth.

11. The method according to claim 9, wherein the resource requirements within said resource graph equals to the sum of resource requirements of the Service Function Chains associated to said at least one network slice.

12. The method according to claim 9, further comprising retrieving workload patterns from a database (SMO DB), and
wherein the resource requirements associated to each nodes and links of said resource graph are determined by mitigating the sum of the resources requirements associated with respective nodes and links of the service Function Chains associated to said at least one network slice, with said workload patterns.

13. The method according to claim 9, wherein said resource requirements of the resource graph comprises minimum allowed resources for operations.

14. The method according to claim 9, wherein subsequently to the receiving a mapping result from said infrastructure manager (InM), an allocation step is performed to allocate the network infrastructure resources for said logical network slice, based on said subset.

15. The method according to claim 9, wherein said allocation step comprises the search of an optimal solution over said subset.

16. A method at an infrastructure manager (InM) for mapping at least a network slice onto a network infrastructure, the method comprising:
- receiving a resource graph from a network slice managing entity (SMO), the resource graph depicting resources needed for providing a service defined by said at least one network slice, and comprising nodes representing infrastructure resources and links representing connections between the nodes and wherein each node corresponds to all occurrence of a same infrastructure resource involved by said at least one network slice, and each link corresponds to all occurrences of a same connection between said infrastructure resources;
- requesting a topology of said network infrastructure and available resources from a database (InM DB);
- mapping said topology and available resources onto said resource graph by solving a Mixed Integer Linear Programming, MILP, problem for minimizing a cost function evaluating the total provisioning cost ($c_{total}$) of said mapping, under a set of constraints;
- determining at least one subset of said network infrastructure adapted for deploying said at least one network slice; and
- transmitting a mapping result to said network slice managing entity, containing said at least one subset of said network infrastructure.

17. The method according to claim 16, wherein said resolution of the MILP problem is performed for a plurality of said at least one slices, said cost function evaluating the total provisioning cost ($c_{total}$) of the mapping of said plurality.

18. The method according to claim 16, further comprising receiving a request from said network slice managing entity containing a set of network infrastructure resources to be allocated.

19. A non-transitory computer readable storage medium storing instructions which, when executed by a computer, cause the computer to perform a method according to claim 9.

* * * * *